(12) United States Patent
Miller et al.

(10) Patent No.: US 9,785,204 B1
(45) Date of Patent: Oct. 10, 2017

(54) RUGGEDIZED MOBILE DEVICE WITH INTEGRATED WIRELESS CHARGING AND SNAP MOUNT

(71) Applicant: MobileDemand LC, Hiawatha, IA (US)

(72) Inventors: Matthew Miller, Cedar Rapids, IA (US); Steven R. Kunert, Cedar Rapids, IA (US)

(73) Assignee: MobileDemand LC, Hiawatha, IA (US)

( * ) Notice: Subject to any disclaimer, the term of this patent is extended or adjusted under 35 U.S.C. 154(b) by 0 days.

(21) Appl. No.: 15/156,081

(22) Filed: May 16, 2016

Related U.S. Application Data (60) Provisional application No. 62/162,480, filed on May 15, 2015.

(51) Int. Cl.
| | |
|---|---|
| *G06F 1/16* | (2006.01) |
| *H04B 1/38* | (2015.01) |
| *G06F 1/18* | (2006.01) |
| *H02J 7/02* | (2016.01) |
| *H04N 13/02* | (2006.01) |
| *H04N 5/33* | (2006.01) |
| *H04B 1/3877* | (2015.01) |
| *H04B 1/3888* | (2015.01) |

(52) U.S. Cl.
CPC ............ *G06F 1/181* (2013.01); *G06F 1/1626* (2013.01); *G06F 1/1637* (2013.01); *G06F 1/1662* (2013.01); *G06F 1/1686* (2013.01); *H02J 7/025* (2013.01); *H04B 1/3877* (2013.01); *H04B 1/3888* (2013.01); *H04N 5/33* (2013.01); *H04N 13/0239* (2013.01); *H04N 13/0253* (2013.01); *H04B 2001/3894* (2013.01)

(58) Field of Classification Search
CPC .......... H04B 1/3877; H04B 2001/3894; H04B 1/3888; G06F 1/181; G06F 1/1626; G06F 1/1632; G06F 1/1637; G06F 1/1662; G06F 1/1686
USPC ....................................................... 455/575.8
See application file for complete search history.

(56) References Cited

U.S. PATENT DOCUMENTS

| | | | | |
|---|---|---|---|---|
| 5,002,184 A | * | 3/1991 | Lloyd ..................... | A45C 11/24 206/305 |
| 5,360,108 A | * | 11/1994 | Alagia ................. | H01H 9/0242 206/320 |
| 5,368,159 A | * | 11/1994 | Doria ................... | H01H 9/0242 206/320 |
| 5,548,306 A | * | 8/1996 | Yates, IV ................ | G06F 3/044 345/174 |
| 5,583,742 A | * | 12/1996 | Noda .................... | G06F 1/1626 248/632 |
| 6,532,152 B1 | * | 3/2003 | White ............... | G02F 1/133308 312/223.1 |

(Continued)

*Primary Examiner* — Adrian S Wilson
(74) *Attorney, Agent, or Firm* — Suiter Swantz pc llo (57) ABSTRACT

A ruggedized mobile computing device is enclosed by a multi-layer housing providing protection of the device and its individual components (e.g., processors, sensors, touchscreens, peripheral devices and ports) from wear and tear, impact shock, and extreme weather conditions. The mobile device may be rechargeable via a resonant charging receiver connectable to a companion resonant charging transmitter housed in a vehicle cradle or mount, to which the mobile device can be removably mounted for hands-free use or use in a motor vehicle. The mobile device may incorporate scanners, cameras, sensors, and other peripheral devices, and further connect to additional external scanners, sensors, or input devices through its peripheral ports.

20 Claims, 7 Drawing Sheets

(56) References Cited

U.S. PATENT DOCUMENTS

| | | | | |
|---|---|---|---|---|
| 6,614,423 B1* | 9/2003 | Wong | G06F 3/0488 | 345/173 |
| 6,616,111 B1* | 9/2003 | White | G06F 1/1626 | 206/320 |
| 8,531,834 B2* | 9/2013 | Rayner | H01H 13/06 | 277/644 |
| 8,775,710 B1* | 7/2014 | Miller | G06F 1/1626 | 361/679.17 |
| 2002/0137475 A1* | 9/2002 | Shou | H04B 1/3838 | 455/575.8 |
| 2003/0095374 A1* | 5/2003 | Richardson | G06F 1/1626 | 361/679.3 |
| 2004/0089570 A1* | 5/2004 | Chien | H04M 1/18 | 206/320 |
| 2008/0081679 A1* | 4/2008 | Kawasaki | H04B 1/3888 | 455/575.8 |
| 2008/0164267 A1* | 7/2008 | Huber | G09F 7/04 | 220/660 |
| 2010/0313485 A1* | 12/2010 | Kuo | A45C 5/03 | 49/484.1 |
| 2012/0018325 A1* | 1/2012 | Kim | A45C 11/00 | 206/320 |
| 2012/0031914 A1* | 2/2012 | Liu | A45C 11/00 | 220/662 |
| 2012/0099261 A1* | 4/2012 | Reber | G06F 1/1632 | 361/679.3 |
| 2012/0103844 A1* | 5/2012 | Piedra | A45F 5/021 | 206/320 |
| 2012/0118773 A1* | 5/2012 | Rayner | G06F 1/1626 | 206/320 |
| 2012/0168336 A1* | 7/2012 | Schmidt | H04M 1/04 | 206/478 |
| 2013/0027862 A1* | 1/2013 | Rayner | H01H 13/06 | 361/679.3 |

* cited by examiner

RUGGEDIZED MOBILE DEVICE WITH INTEGRATED WIRELESS CHARGING AND SNAP MOUNT

CROSS-REFERENCE TO RELATED APPLICATIONS

This application claims priority under 35 U.S.C. §119(e) to provisional U.S. Patent Application Ser. No. 62/162,480, filed on May 15, 2015. This application is related to U.S. patent applications Ser. No. 15/156,149, filed on May 16, 2016, and Ser. No. 15/156,107, filed on May 16, 2016. Said provisional U.S. Patent Application 62/162,480 and related U.S. patent application Ser. Nos. 15/156,149 and 15/156,107 are herein incorporated by reference in their entirety.

BACKGROUND

Portable tablet computing devices may increase productivity while maintaining a small lightweight form factor. Goals of manufacturers of these tablet devices may include light weight, fast processors, and long battery life. On occasion, these goals may conflict. For example, a light weight battery powered device may be configured with a small, lower powered battery of limited usable life. A powerful processor may require a larger form factor and increased weight. A variety of communication ports may require a large form factor and a heavier complete system. Portable tablets may incorporate a broadening array of tools, such as three-dimensional imagers, volume dimensioning systems, and advanced sensors, but the ability to use these tools remotely may demand the capability to protect a delicate, complex, and powerful machine from shock, moisture, and extreme conditions. It may be desirable for a mobile computing device to be variably ruggedized, balancing durability and mobility to provide optimal computing power throughout a broad range of environmental conditions.

SUMMARY

In a first aspect, embodiments of the inventive concepts disclosed herein are directed to a ruggedized mobile computing device or tablet. The ruggedized tablet may include a substantially rectangular housing having a touchscreen in the front face, and four reinforced edges of a molded, rigid high impact material. The touchscreen may include an oleophobic outer coating or layer adhered to the touchscreen. The corners of the housing may further be reinforced by rubberized cushions. The housing may enclose the processors and memory of the tablet. A wireless transceiver may wirelessly link the tablet to other remotely located devices or data networks. The tablet may incorporate a camera and multiple sensors, including inertial or absolute position sensors. The edges of the housing may include peripheral ports for connecting the tablet to external devices or a power supply, and hinged protective panels for the protection of the peripheral ports, camera, or exposed sensors. The rear face of the housing may incorporate a mounting plate, which may be molded into the rear face or removably attached; the mounting plate may include rails for attaching the tablet to a cradle or mount for hands-free support of the tablet.

In a further aspect, embodiments of the inventive concepts disclosed herein are directed to a mobile computing device, or tablet, having a removable ruggedized housing. The mobile device may be enclosed in a rectangular casing having a front face incorporating a touchscreen and four exterior edges terminating in rounded corners. The touchscreen may include an oleophobic outer coating or layer adhered to the touchscreen. The mobile device may include processors, a memory, and a wireless transceiver for linking the mobile device wirelessly to other devices or networks. The mobile device may include a camera and multiple sensors, including an absolute or inertial position sensor. The exterior edges of the casing may include peripheral ports for coupling the mobile device to external devices or attaching the external devices to the mobile device. The casing (with the exception of the touchscreen) may be protectively enclosed in a rubberized inner housing which includes reinforced corners for cushioning the corners of the mobile device from impact shock. The inner housing may include apertures exposing the camera and peripheral ports. The inner housing (with the exception of the reinforced corners) may be further protected and enclosed by a high impact outer housing including hinged protective panels for protecting the camera and peripheral ports exposed by the apertures in the inner housing. The rear face of the outer housing may include a mounting plate molded into, or removably attached to, the rear face; the mounting plate may include rails for attaching the mobile device to a cradle or mount designed to support the mobile device for hands-free operation.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a ruggedized mobile device, which may include a smartphone, pad, or tablet. The mobile device may be enclosed by a removable multi-level housing offering protection from the elements as well as shock absorption, or the protective housing may be integrated into the mobile device. The mobile device may be rechargeable via a resonant charging receiver connectable to a companion transmitter of a vehicle cradle to which the mobile device can be removably mounted for hands-free use or use in a motor vehicle.

Figure 1:
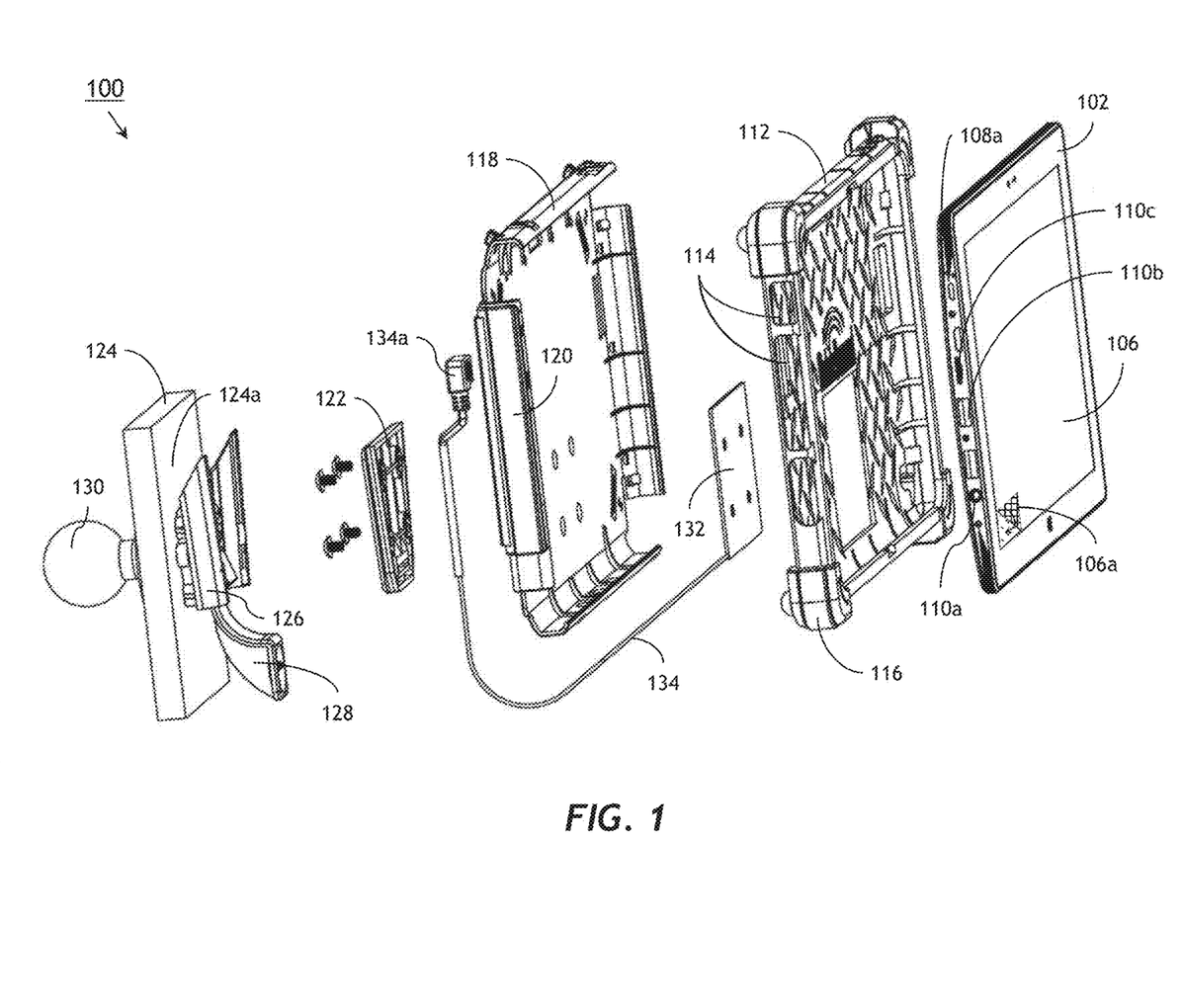
FIG. 1 is an exploded view of an exemplary embodiment of a system according to the inventive concepts disclosed herein.

Referring to FIG. 1, an exemplary embodiment of a ruggedized mobile computing system 100 may include a tablet, pad, smartphone, or similar mobile computing device 102. The mobile device 102 may incorporate, in its front face 104, a touchscreen 106 for displaying data generated or retrieved by the mobile device, and for accepting input from a user of the mobile device. The touchscreen 106 may be fashioned of shatterproof glass and incorporate an oleophobic exterior layer or coating (e.g., screen protector) 106a adhered to the exterior surface of the touchscreen 106. The screen protector 106a may be fashioned of tempered glass, chemically strengthened to resist breakage and scratches (by enhancing the overall hardness of the screen protector). It is contemplated that the screen protector 106a may have a Mohs hardness rating of at least 8 H and preferably 9 H; the oleophobic outer layer may protect the touchscreen from fingerprints, smudges, or exterior moisture while preserving the clarity of images displayed via the touchscreen 106. The exterior edges 108 of the mobile device 102 may terminate in substantially rounded corners (108a). One or more exterior edges 108 may incorporate peripheral ports 110 for connecting external devices to the mobile device 102 or to individual components of the mobile device. For example, an exterior edge 108 may include a DC power connector 110a, a USB port 110b, an audio/headphone port (not shown) or an HDMI port 110c. An exterior edge 108 may include one or more edge-mounted cameras or image sensors, such as a three-dimensional imaging system as described in related application 15-1-2, which may require an unobstructed line of sight to operate.

The mobile device 102 may be protected from the elements and cushioned from shock by a multi-component housing. The multi-component housing may include an inner housing 112 fashioned of a flexible silicone rubber and substantially enclosing the mobile device 102, with the exception of the touchscreen 106. In a preferred embodiment, the inner housing 112 is fashioned of a rubber or rubberized material having a Shore durometer rating between A50 and A80. In a preferred embodiment, the inner housing is fashioned of Shore A60 silicone rubber. The inner housing 112 may substantially enclose the exterior edges 108, with the exception of apertures 114 corresponding to the peripheral ports 110 and allowing for their unhindered use when the mobile device 102 is enclosed by the inner housing 112. The inner housing may include reinforced rubberized cushions 116 corresponding to the corners 108a of the mobile device 102a, and providing added shock absorption for the corners of the mobile device. An exemplary embodiment of the system 100 may withstand 4 ft (48 in) Transit Drop testing as outlined in Military Standard MIL-STD-810G (Method 516.6, Procedure IV).

The inner housing 112 (and the mobile device 102 enclosed thereby) may be further protected by an outer housing 118 fashioned of a molded rigid high impact material, e.g., molded polycarbonate, acrylonitrile butadiene styrene (ABS), or an alloy of polycarbonate and ABS. The outer housing 118 may reinforce and enclose the rear face of the inner housing 112 as well as the exterior edges 108. The outer housing 118 may include a single hinged panel 120 (or outer apertures) that may be opened or closed to gain or restrict access (via the apertures 114 of the inner housing) to the peripheral ports 110. The outer housing 118 may include a mounting plate 122. The mounting plate may secure the mobile device 102 (enclosed by the inner housing 112 and outer housing 118) to a cradle 124 by one or more rails 126. The cradle 124 may include a support 128 on which the mobile device 102 may rest for hands-free use (e.g., in a motor vehicle). For example, the cradle 124 may be rotatably mounted to the dashboard of a motor vehicle via a ball mount 130. The mobile device 102 may be powered by a rechargeable battery pack and incorporate a resonant charging receiver 132 for recharging the battery pack. For example, the resonant charging receiver 132 may receive power from a resonant charging transmitter incorporated into the cradle 124. The resonant charging receiver 132 may be mounted to the rear face of the mobile device 102, and receive power via a cable 134 connecting the resonant charging receiver to a power lead 134a on the rear face of the outer housing 118. The power lead 134a may in turn receive power from the resonant charging transmitter of the cradle 124.

Figure 2A:
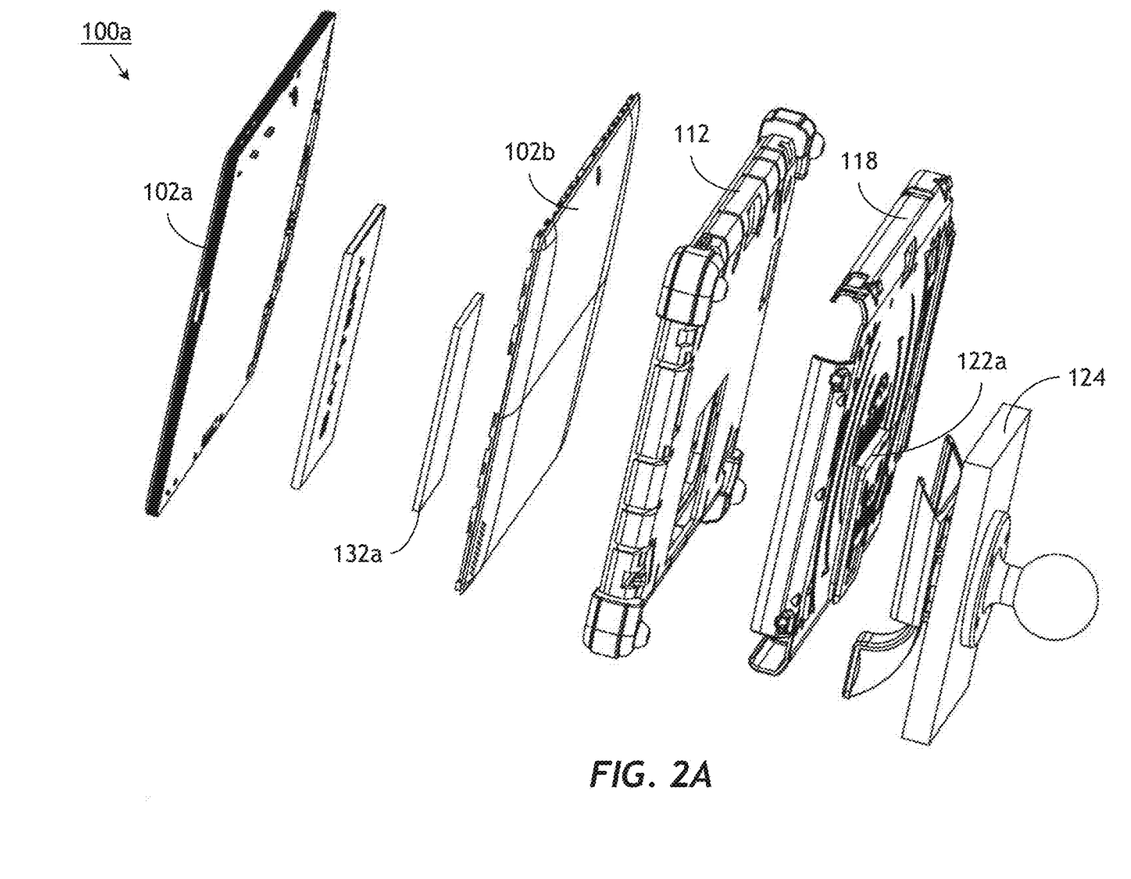
FIG. 2A is a reverse exploded view of the mobile device of FIG. 1.

Referring to FIG. 2A, the system 100a may operate identically to the system 100 of FIG. 1, except that the mobile device 102 of the system 100a may incorporate a resonant charging receiver 132a enclosed by the front casing 102a and the rear casing 102b of the mobile device 102, proximate to the battery pack 136. The mounting plate 122a of the outer housing 118 may be molded into the rear face of the outer housing, rather than removably attached, and include a power connector for receiving power from the resonant charging transmitter 124a of the cradle 124.

Figure 2B:
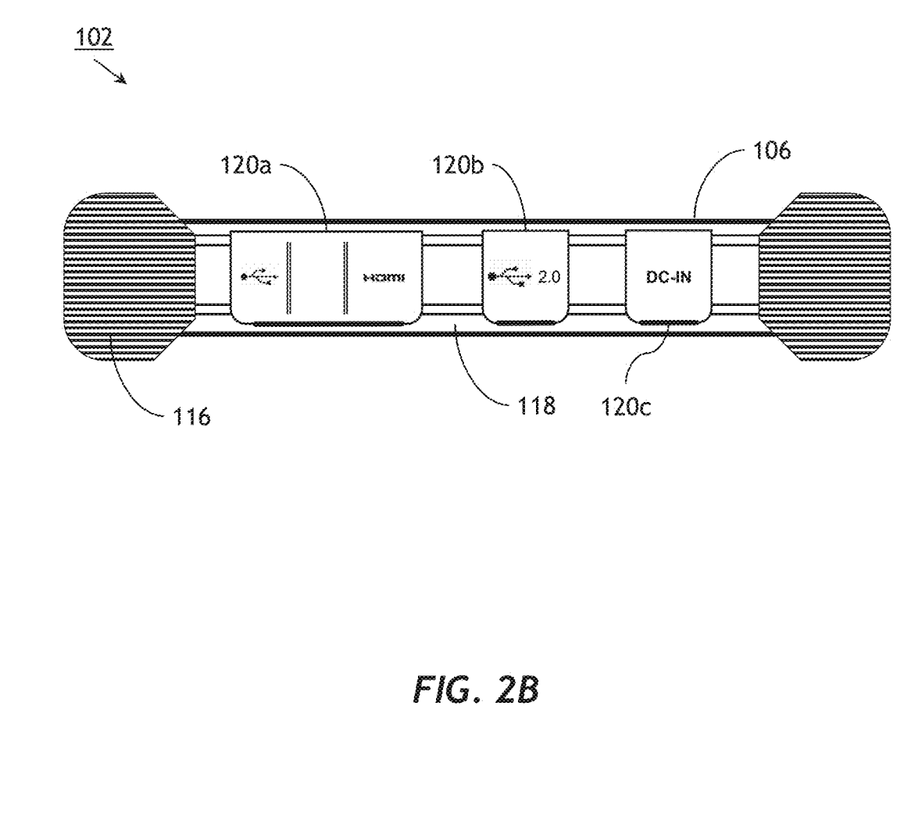
FIG. 2B is a side view of an exemplary embodiment of a mobile device according to the inventive concepts disclosed herein.

Referring also to FIG. 2B, one or more exterior edges of the outer housing 118 may include multiple hinged protective panels 120a-c for providing or restricting access to peripheral ports 110 of the mobile device 102. For example, a hinged panel 120a may protect a group of peripheral ports, such as a USB port 110b and an HDMI port 110c (FIG. 1); a hinged panel 210b may protect a USB 2.0 port; and a hinged panel 210c may protect a DC power connector 110a.

Figure 3:
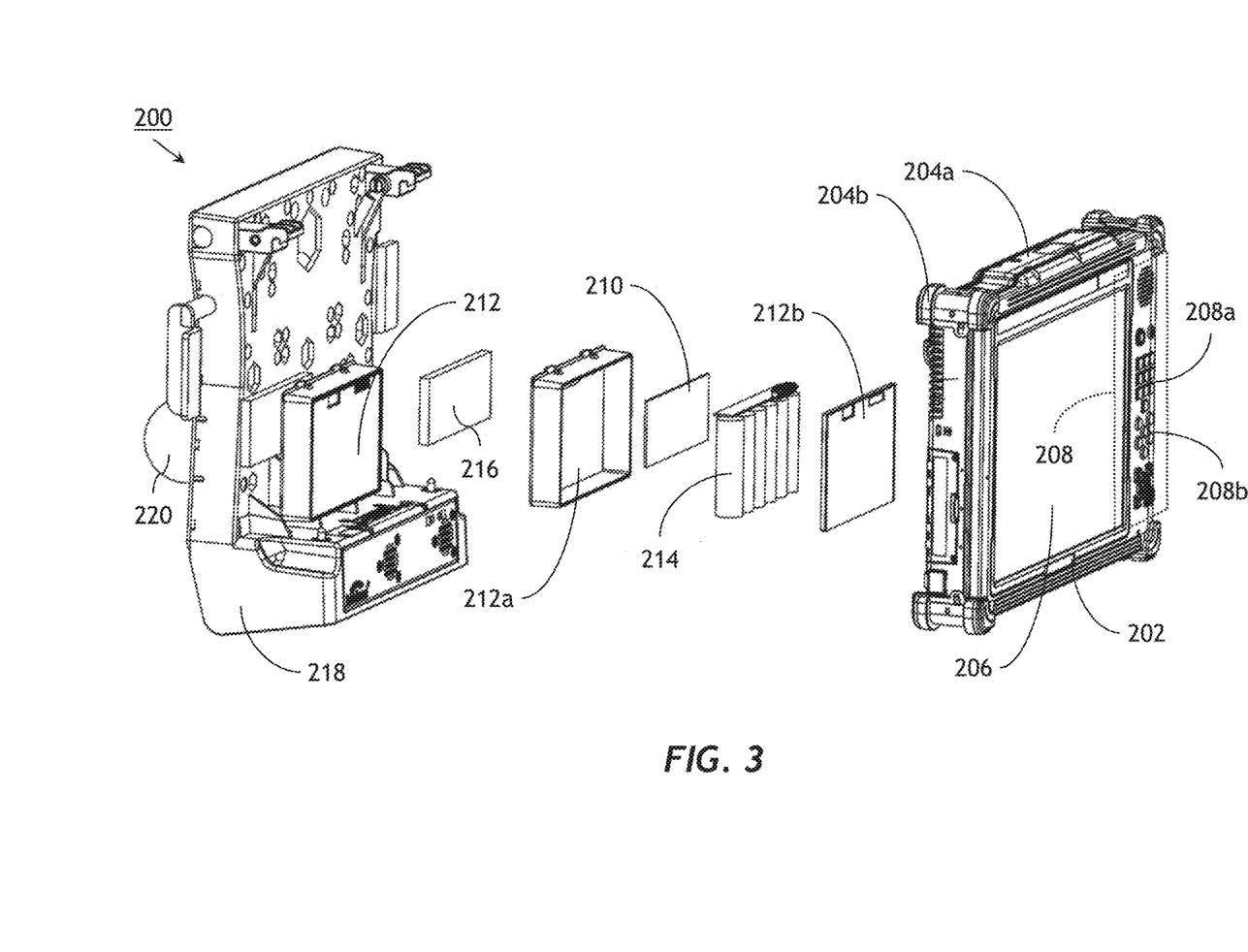
FIG. 3 is an exploded view of an exemplary embodiment of system according to the inventive concepts disclosed herein.

Referring to FIG. 3, an exemplary embodiment of a ruggedized mobile computing system 200 may operate identically to the system 100 of FIG. 1, except that the system 200 may include an integrated mobile device 202. The integrated mobile device 202 may be a smartphone, pad, tablet, or similar mobile computing device permanently enclosed in a protective housing 204. The protective housing 204 may include rigid high-impact exterior panels 204a at the exterior edges and reinforced rubberized corners 204b. The exterior panels 204a may be fashioned of, e.g., molded polycarbonate, ABS, or a polycarbonate/ABS alloy, and the reinforced rubberized corners 204b may be fashioned preferably of Shore A60 silicone rubber, or in the alternative a rubber or rubberized material having a Shore durometer rating between A50 and A80. The front face of the protective housing 204 may include a touchscreen 206 and a control panel 208. The control panel 208 may include one or more sets of physical buttons and keys, including a numeric keypad 208a or directional keys 208b. The integrated mobile device 202 may include a resonant charging receiver 210 enclosed by the battery pack 212. The battery pack 212 may further include one or more battery cells 214 enclosed by a front casing 212a and a rear casing 212b, mounted within the rear face of the protective housing 204. The resonant charging receiver 210 may recharge the battery cells 214 via power received from a resonant charging transmitter 216 housed in a vehicle cradle 218. The vehicle cradle 218 may be rotatably mounted to the dashboard of a motor vehicle by a rear ball mount 220.

Figure 4:
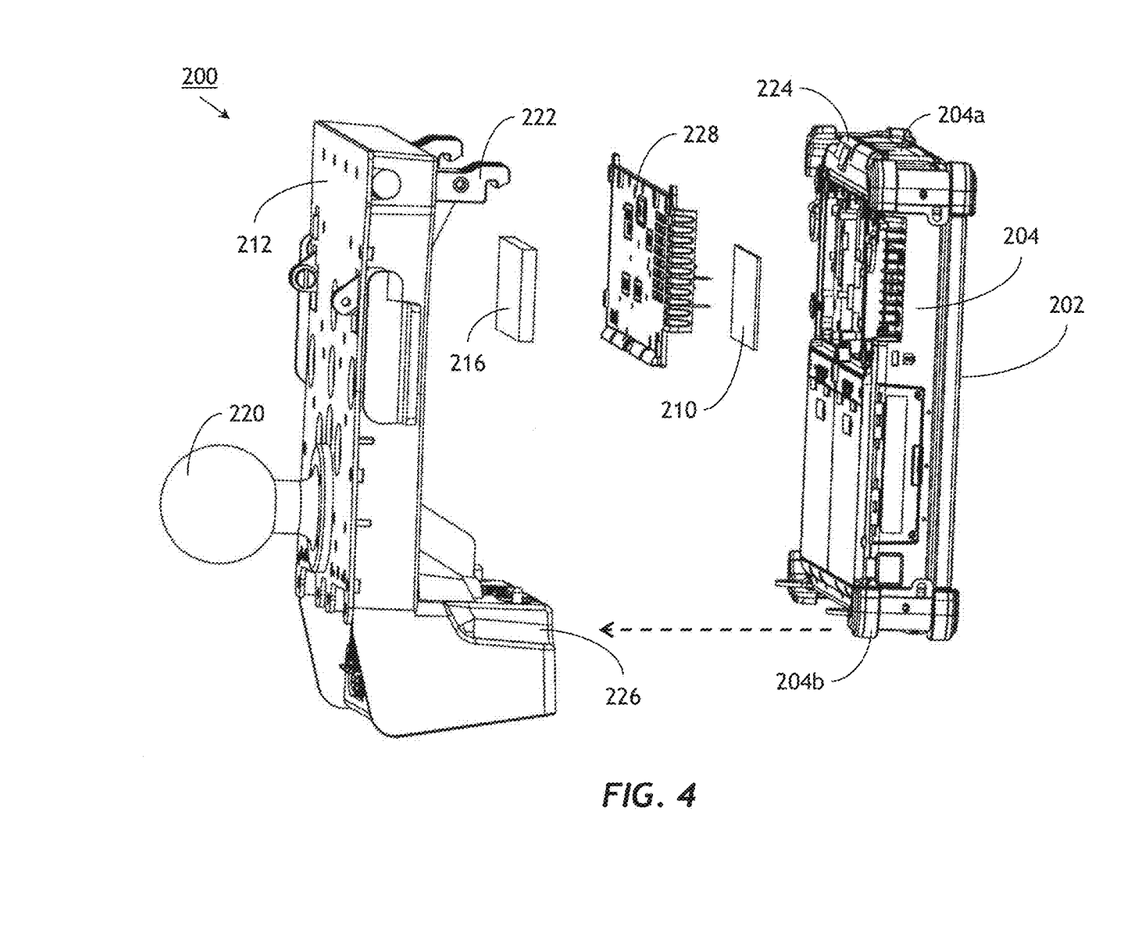
FIG. 4 is a reverse exploded view of the mobile device of FIG. 3.

Referring also to FIG. 4, the integrated mobile device 202 may be mounted or positioned in the vehicle cradle 218 by a mounting plate and opposing rails as shown by FIGS. 1 and 2, or via hooks 222 extending from the top of the vehicle cradle 218 and rotatably and removably securing a corresponding rail 224 of a top exterior edge 204a of the protective housing 204. The integrated mobile device 204 may be supported in the vehicle cradle 218 by indentations 226 contoured to the reinforced rubberized corners 204b. A removable access panel 228 may enclose the resonant charging receiver 210 (itself enclosed within battery pack 212, FIG. 3) within the rear face of the protective housing 204. The resonant charging receiver 210 may receive power (from the resonant charging transmitter 216 mounted in the vehicle cradle 218) via contacts or leads in the access panel 228.

Figure 5:
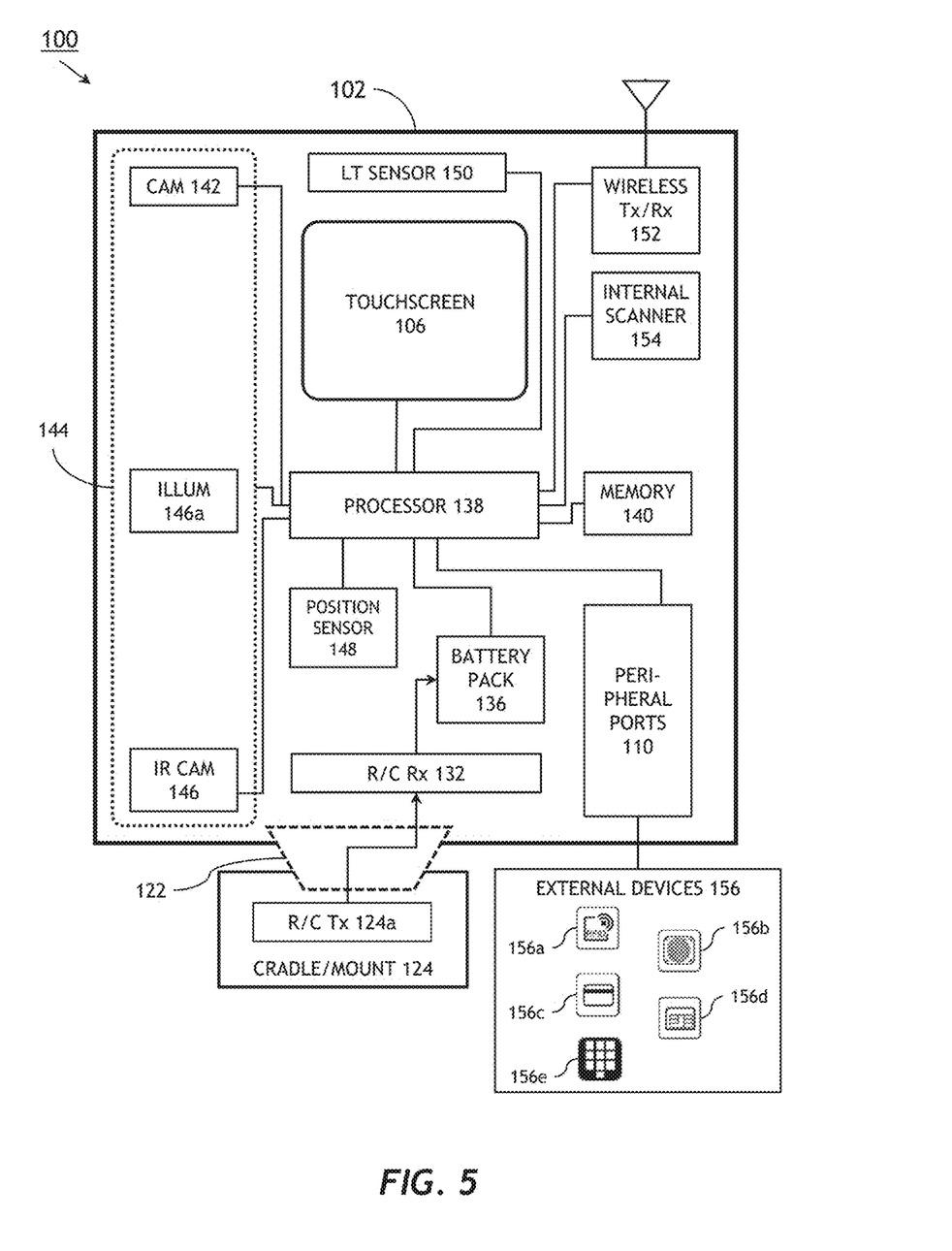
FIG. 5 is a block diagram illustrating the system of FIG. 1.

Referring to FIG. 5, a block diagram of components of the system 100 of FIG. 1 is shown. The mobile device 102 may include processors 138 and a memory 140 or similar onboard means of data storage. The mobile device 102 may include a camera 142, which may be capable of detecting visible light (e.g., an RGB, or red/green/blue, camera) or a component of a 3D imaging system 144, which may additionally include an infrared (IR) camera 146 capable of detecting IR-band radiation and an IR illuminator 146a for emitting IR radiation toward a subject so that it may be "seen" by the IR camera 146. The mobile device 102 may include a position sensor 148 and an ambient light sensor 150; the position sensor 148 may be an absolute position sensor (e.g., a GNSS receiver) or an inertial measurement unit (IMU) such as an accelerometer, gyrometer, e-compass, or proximity sensor. The mobile device 102 may include a wireless transceiver 152 for wirelessly connecting the mobile device to remote devices or to data networks (e.g., Bluetooth, Ethernet). The mobile device 102 may incorporate one or more peripheral devices 154, such as a barcode or RFID scanner, or connect to one or more external peripheral devices 156 via the peripheral ports 110. The external peripheral devices 156 may or may not physically attach to the mobile device 102 via the peripheral ports 110 and may include an RFID scanner 156a, a fingerprint scanner 156b, a magnetic card reader 156c, a smartcard reader 156d, and a Personal Identification Number (PIN) entry pad 156e.

Figure 6A:
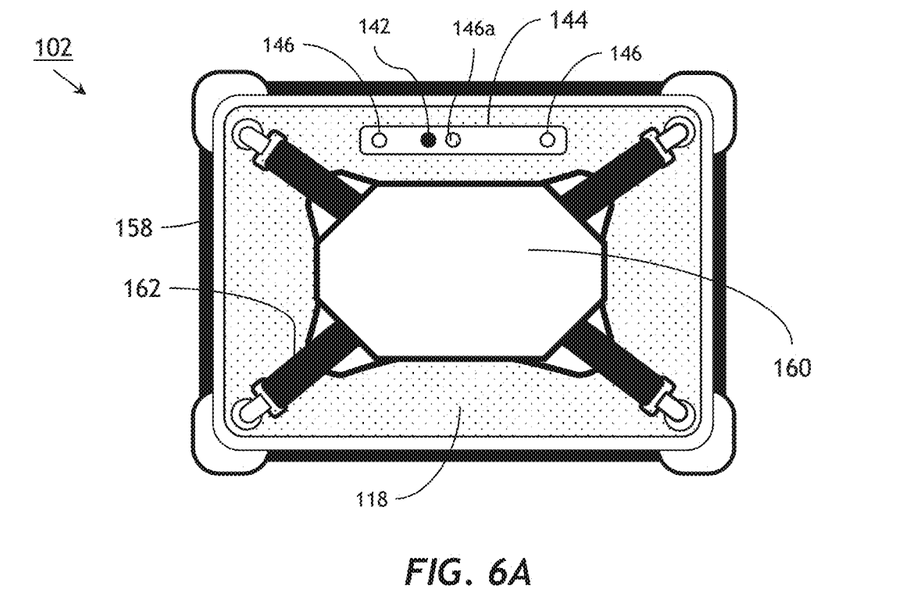
FIGS. 6A and 6B are reverse views of the mobile device of FIG. 1.

Referring to FIG. 6A, the mobile device 102 of the system 100 may include D-rings 158 rotatably mounted to each corner of the rear face of the outer housing 118. Each D-ring 158 may be capable of rotating through a full 360 degrees. The system 100 may include a rear-mounted handstrap 160 for securing the grip of a user (e.g., a single-hand grip) on the mobile device 102. The handstrap 160 may be fashioned of leather, simulated leather, or a similar flexible material and may be removably attached to the rear face of the outer housing 118 via a series of flexible straps 162 (fashioned of nylon or a similarly durable fabric) connecting the handstrap to the D-rings 158 mounted at the corners of the rear face. In some embodiments, the 3D imaging system 144 may be mounted not in an exterior edge of the mobile device 102, but in the rear face of the outer housing 118. The 3D imaging system 144 may include left and right depth-sensing IR cameras 146, an IR illuminator 146a, and an RGB camera 142.

Figure 6B:
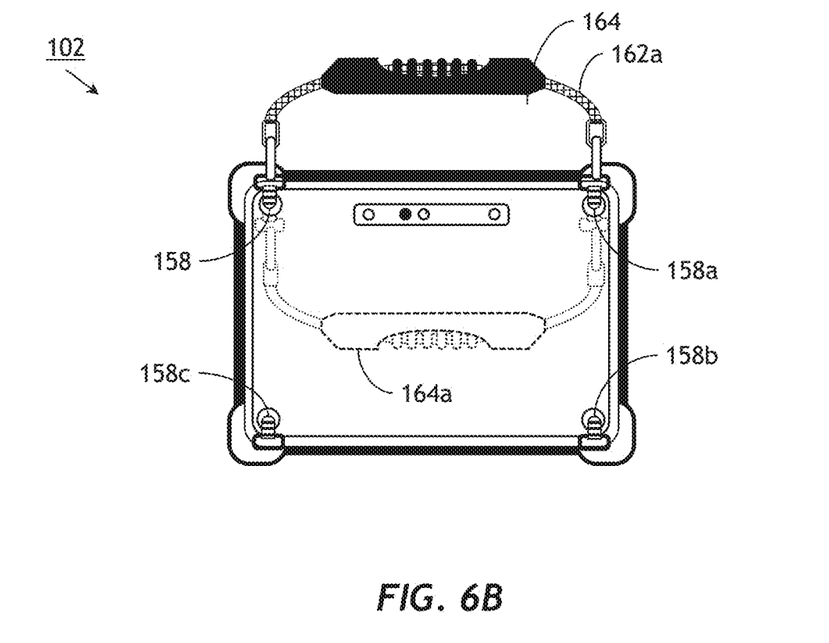

Referring also to FIG. 6B, the mobile device 102 of FIG. 6A may include a carrying handle 164 fashioned of a rubberized material and attachable to the mobile device by a strap 162a. The strap 162a may be threaded through the carrying handle 164, and may be removably attached at either end to an adjacent pair of D-rings 158, 158a-c. For example, the strap 162a may be attached to adjacent D-rings 158, 158a (for carrying the mobile device 102 in a landscape configuration) or to adjacent D-rings 158a, 158b (for carrying the mobile device 102 in a portrait configuration). When the strap 162a is attached to adjacent D-rings 158, 158a (or 158b, 158c) such that the mobile device 102 is supported in a landscape configuration, as shown by FIG. 6B, the carrying handle 164 may be folded (164a) behind the rear face of the outer housing 118 to support the mobile device 102, raising the viewing angle of a mobile device 102 positioned on a table, desktop or like surface (e.g., at a horizontal or near-zero viewing angle).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A ruggedized mobile computing system, comprising:
  a mobile computing device enclosed in a casing, the casing having a
    rectangular front face incorporating a touchscreen including a screen protector fashioned of tempered glass having a hardness of at least 8 H and including an oleophobic exterior layer, the screen protector adhered to the touchscreen;
    a rear face opposite the front face; and
    four exterior edges terminating in four rounded corners;
  the mobile computing device configured with one or more processors and a memory and including
    at least one wireless transceiver configured to establish a wireless link to at least one remote device;
    at least one camera coupled to the one or more processors;
    at least one sensor coupled to the one or more processors, the at least one sensor including at least one position sensor;
    one or more peripheral ports positioned in the four exterior edges;
  an inner housing configured to proximately and removably enclose the rear face and the four exterior edges, the inner housing fashioned of a flexible material and including
    four rubberized cushions configured to enclose the four rounded corners; and
    one or more apertures configured to expose one or more of the at least one camera, the at least one sensor, and the one or more peripheral ports; and
  an outer housing configured to proximately and removably enclose the inner housing, the outer housing fashioned of a molded rigid material and including
    one or more protective panels configured to hingedly enclose the one or more apertures; and
    a mounting plate proximal to the rear face, the mobile computing device slidably attachable to a cradle configured to support the mobile computing device via the mounting plate.

2. The system of claim 1, wherein the at least one camera includes a 3D imaging system, the 3D imaging system including:
  a first camera configured to a) detect electromagnetic (EM) radiation in at least a visible spectral band and b) capture at least one first image associated with a subject;
  a second camera separated from the first camera by a first distance, the first distance at most the width of the first external edge, the second camera configured to a) detect EM radiation in an infrared (IR) spectral band and b) capture at least one second image associated with the subject; and
  an illuminator configured to a) emit EM radiation in an IR spectral band and b) determine at least one second distance associated with one or more of the first image and the second image.

3. The system of claim 1, wherein:
  the molded rigid material includes at least one of polycarbonate, ABS, and an alloy of polycarbonate and ABS; and
  the inner housing is fashioned of silicone rubber having a Shore durometer rating between 50 A and 80 A.

4. The system of claim 1, wherein the mounting plate is fashioned of the molded rigid material and removably attached to the rear face.

5. The system of claim 1, further comprising:
  at least one battery; and
  a resonant charging receiver coupled to the at least one battery and configured to recharge the at least one battery.

6. The system of claim 5, wherein the cradle includes a resonant charging transmitter configured to supply power to the resonant charging receiver.

7. The system of claim 6, wherein the resonant charging receiver is coupled to the mounting plate by at least one cable and configured to receive power from the resonant charging transmitter via the at least one cable.

8. The system of claim 1, wherein:
  the at least one sensor includes an ambient light sensor, and the at least one position sensor includes at least one of a GNSS receiver, an accelerometer, a compass, and a proximity sensor; and
  the one or more peripheral ports include at least one of USB port, a power connector, an HDMI port, an audio port, and a device port configured to connect to an external device removably attached to the mobile computing device.

9. The system of claim 8, wherein the at least one external device includes at least one of an RFID scanner, a fingerprint scanner, a magnetic card reader, a smartcard reader, and a PIN pad.

10. The system of claim 1, wherein the mobile computing device includes at least one of a smartphone and a tablet.

11. A ruggedized mobile computing apparatus, comprising:
  a mobile computing device including a housing having a rectangular front face incorporating
    a touchscreen including a screen protector fashioned of tempered glass having a hardness of at least 8 H and including an oleophobic exterior layer, the screen protector adhered to the touchscreen;
    a rear face opposite the front face; and
    four exterior edges fashioned of a molded rigid material and terminating in four rounded corners enclosed by rubberized cushions;
  the mobile computing device including
    one or more processors and a memory enclosed by the housing;

at least one wireless transceiver configured to establish a wireless link to at least one remote device;

at least one camera coupled to the one or more processors;

at least one sensor coupled to the one or more processors, the at least one sensor including at least one position sensor; and one or more peripheral ports positioned in the four exterior edges, one or more of the at least one camera, the at least one sensor, and the one or more peripheral ports hingedly enclosed by protective panels fashioned of the molded rigid material;

the rear face incorporating a mounting plate, the mobile computing device slidably attachable to a cradle configured to support the mobile computing device via the mounting plate.

12. The apparatus of claim 11, wherein the at least one camera includes a 3D imaging system, the 3D imaging system including:

a first camera configured to a) detect electromagnetic (EM) radiation in at least a visible spectral band and b) capture at least one first image associated with a subject;

a second camera separated from the first camera by a first distance, the first distance at most the width of the first external edge, the second camera configured to a) detect EM radiation in an infrared (IR) spectral band and b) capture at least one second image associated with the subject; and an illuminator configured to a) emit EM radiation in an IR spectral band and b) determine at least one second distance associated with one or more of the first image and the second image.

13. The apparatus of claim 11, wherein:

the molded rigid material includes at least one of polycarbonate, ABS, and an alloy of polycarbonate and ABS; and the rubberized cushions are fashioned silicone rubber having a Shore durometer rating between A50 and A80.

14. The apparatus of claim 11, wherein the mounting plate is fashioned of the molded rigid material and removably attached to the rear face.

15. The apparatus of claim 11, further comprising:

at least one battery enclosed by the housing; and a resonant charging receiver coupled to the at least one battery and configured to recharge the at least one battery.

16. The apparatus of claim 15, wherein the cradle includes a resonant charging transmitter configured to supply power to the resonant charging receiver.

17. The apparatus of claim 16, wherein the resonant charging receiver is coupled to the mounting plate by at least one cable and configured to receive power from the resonant charging transmitter via the at least one cable.

18. The apparatus of claim 11, wherein:

the at least one sensor includes an ambient light sensor, and the at least one position sensor includes at least one of a GNSS receiver, an accelerometer, a compass, and a proximity sensor; and the one or more peripheral ports include at least one of USB port, a power connector, an HDMI port, an audio port, and a device port configured to connect to an external device removably attached to the mobile computing device.

19. The apparatus of claim 18, wherein the at least one external device includes at least one of an RFID scanner, a fingerprint scanner, a magnetic card reader, a smartcard reader, and a PIN pad.

20. The apparatus of claim 11, wherein the front face includes at least one physical keypad, the at least one physical keypad including at least one of a numeric keypad and a directional keypad.

* * * * *